United States Patent
Yu et al.

(10) Patent No.: US 9,182,620 B1
(45) Date of Patent: Nov. 10, 2015

(54) CURVATURE ADJUSTMENT STRUCTURE OF CURVED LIQUID CRYSTAL DISPLAY DEVICE

(71) Applicant: Shenzhen China Star Optoelectronics Technology Co., Ltd., Shenzhen, Guangdong (CN)

(72) Inventors: Gang Yu, Guangdong (CN); Yuchun Hsiao, Guangdong (CN); Dehua Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 8 days.

(21) Appl. No.: 14/374,507

(22) PCT Filed: May 28, 2014

(86) PCT No.: PCT/CN2014/078670
§ 371 (c)(1),
(2) Date: Jul. 24, 2014

(30) Foreign Application Priority Data

May 14, 2014 (CN) .......................... 2014 1 0204507

(51) Int. Cl.
*G02F 1/1333* (2006.01)
*G06F 1/16* (2006.01)

(52) U.S. Cl.
CPC ................. *G02F 1/133308* (2013.01); *G02F 2001/133314* (2013.01); *G06F 1/1601* (2013.01)

(58) Field of Classification Search
None
See application file for complete search history.

(56) References Cited

U.S. PATENT DOCUMENTS

| 9,081,540 B1* | 7/2015 | Cho ...................... G06F 1/1601 |
| 2014/0268584 A1* | 9/2014 | Song ........................ H05K 7/02 361/728 |

* cited by examiner

*Primary Examiner* — Richard Kim
(74) *Attorney, Agent, or Firm* — Andrew C. Cheng

(57) ABSTRACT

The present invention provides a curvature adjustment structure of a curved liquid crystal display device, which includes: a backplane (1), at least one threaded rod (3) fixedly mounted to the backplane (1), a rack (5) arranged to correspond to the threaded rod (3) and having two ends positioned against the backplane (1), and an adjustment nut (7) in threading engagement with the threaded rod (3). The threaded rod (3) extends through the rack (5) and then mates the adjustment nut (7), whereby by rotating the adjustment nut (7) to compress or release the rack (5), the rack (5) is caused to compress or release the backplane (1) so as to achieve the adjustment of the curvature of the backplane (1). The adjustment of the curvature of the curved liquid crystal display device is made easy, improving the product appeal to the market and simplifying the structure to make it easy to make.

15 Claims, 3 Drawing Sheets

CURVATURE ADJUSTMENT STRUCTURE OF CURVED LIQUID CRRYSTAL DISPLAY DEVICE

BACKGROUND OF THE INVENTION

1. Field of the Invention

The present invention relates to the field of liquid crystal displaying, and in particular to a curvature adjustment structure of a curved liquid crystal display device.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

A liquid crystal display device generally comprises an enclosure, a liquid crystal panel arranged in the enclosure, and a backlight module mounted in the enclosure. The principle of operation of the liquid crystal panel is that liquid crystal molecules are arranged between two parallel glass substrates and a plurality of vertical and horizontal tiny electrical wires are arranged between the two glass substrates and electricity is applied to control the liquid crystal molecules to change direction in order to refract light emitting from the backlight module to pass through a pixel structure formed on the glass substrates to generate a color image. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel and light is homogenized by a diffusion plate to form a planar light source supplied to the liquid crystal panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal panel.

Recently, with the progress of the liquid crystal displaying technology, major manufacturers have marketed curved liquid crystal display devices one after another. Generally speaking, the curved liquid crystal display devices allow for the best viewing effect from edge to edge, while a regular liquid crystal display device has poor capability of displaying at edges of a screen. The curved liquid crystal display devices has a screen that is entirely of a curved design to provide a wide full-view image, allowing for the same visual enjoyment at both the central portion and the circumferential portion of the screen and also reducing distortion of off-axis viewing for viewing at a short distance. Further, the curved liquid crystal display device allows a viewer's viewing distance to be extended, achieving better experience of viewing. Thus, compared to the regular liquid crystal display devices, the curved liquid crystal display devices have advantages, including: (1) brand differentiating, (2) wider viewable angle, and (3) reducing distortion for short distance viewing.

The conventional ways of forming a curved liquid crystal display device generally include: (1) mounting a support rack having a specific curve to a backplane to force the backplane to deform into a curve consistent with that of the rack; and (2) directly forming a structure of a curved surface on the backplane. However, the curvature of a liquid crystal display device obtained with both of the two ways is fixed and no adjustment is available to suit the need of watching of a user, whereby the view angle is subjected to undesired constraint and the structure is relatively complicated, making the cost high.

SUMMARY OF THE INVENTION

An object of the present invention is to provide a curvature adjustment structure of a curved liquid crystal display device, which allows for easy and efficient adjustment of the curvature of a curved liquid crystal display device to achieve different conditions of displaying to suit different needs so as to improve the appeal of products to the market and make the structure simplified and easy to make.

To achieve the above object, the present invention provides a curvature adjustment structure of a curved liquid crystal display device, which comprises a backplane, at least one threaded rod fixedly mounted to the backplane, a rack arranged to correspond to the threaded rod and having two ends positioned against the backplane, and an adjustment nut in threading engagement with the threaded rod, wherein the threaded rod extends through the rack and mates the adjustment nut, whereby by rotating the adjustment nut to compress or release the rack, the rack is caused to compress or release the backplane so as to achieve adjustment of the curvature of the backplane.

The curvature adjustment structure of the curved liquid crystal display device further comprises a backing ring arranged between the adjustment nut and the rack.

The rack comprises a rack body and engagement sections connected to opposite ends of the rack body and the rack. The engagement sections are set in tight engagement with the backplane. The rack body is of a curved form.

The rack body has a center in which a through hole is formed to receive the extension of the threaded rod. The rack is symmetrically arranged.

The rack body comprises a raised annular step formed around the through hole. The backing ring is fit around the raised annular step. The backing ring has a thickness greater than height of the raised annular step.

The adjustment nut comprises a threading engagement section in threading engagement with the threaded rod and a handle connected to the threading engagement section.

The rack is made of a material having stiffness and strength greater than stiffness and strength of a material of the backplane.

The backplane is made of spring steel or a plastic material.

The adjustment nut comprises a threading engagement section in threading engagement with the threaded rod and an adjustment gear connected to the threading engagement section. The adjustment gear mates a power gear.

The number of threaded rod, the rack, and the adjustment nut is three for each, which are arranged in an equally spaced manner. The adjustment gear of the one of the adjustment nuts that is located in the middle mates the power gear. The adjustment gear of the one of the adjustment nuts that is located in the middle is in engagement with the adjacent ones of the adjustment gears via transmission gears for power transmission.

The present invention further provides a curvature adjustment structure of a curved liquid crystal display device, which comprises a backplane, at least one threaded rod fixedly mounted to the backplane, a rack arranged to correspond to the threaded rod and having two ends positioned against the backplane, and an adjustment nut in threading engagement with the threaded rod, wherein the threaded rod extends through the rack and mates the adjustment nut, whereby by rotating the adjustment nut to compress or release the rack, the rack is caused to compress or release the backplane so as to achieve adjustment of the curvature of the backplane;

further comprising a backing ring arranged between the adjustment nut and the rack;

wherein the rack comprises a rack body and engagement sections connected to opposite ends of the rack body and the rack, the engagement sections being set in tight engagement with the backplane, the rack body being of a curved form; and wherein the rack body has a center in which a through hole is formed to receive the extension of the threaded rod, the rack being symmetrically arranged.

The rack body comprises a raised annular step formed around the through hole. The backing ring is fit around the raised annular step. The backing ring has a thickness greater than height of the raised annular step.

The adjustment nut comprises a threading engagement section in threading engagement with the threaded rod and a handle connected to the threading engagement section.

The rack is made of a material having stiffness and strength greater than stiffness and strength of a material of the backplane.

The backplane is made of spring steel or a plastic material.

The efficacy of the present invention is that the present invention provides a curvature adjustment structure of a curved liquid crystal display device, in which a threaded rod is fixedly mounted to a backplane and a curved rack is arranged with two ends thereof positioned against the backplane, an adjustment nut being provided in threading engagement with the threaded rod, so that by rotating the adjustment nut to compress or release the rack, the rack may compress or release the backplane in order to achieve adjustment of the curvature of the backplane thereby making the adjustment of the curvature of the curved liquid crystal display device easy, improving the product appeal to the market, and simplifying the structure to make it easy to make.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
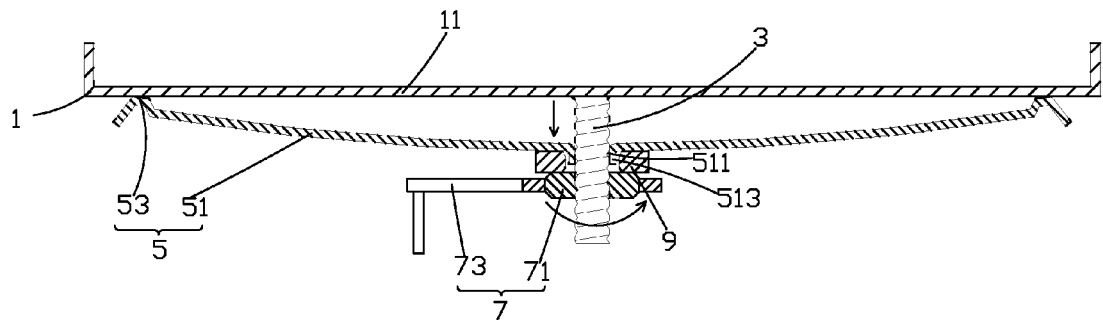
FIG. 1 is a top-side cross-sectional view showing a curvature adjustment structure of a curved liquid crystal display device according to a first embodiment of the present invention in which a backplane is in a condition of being not curved yet.
Figure 2:
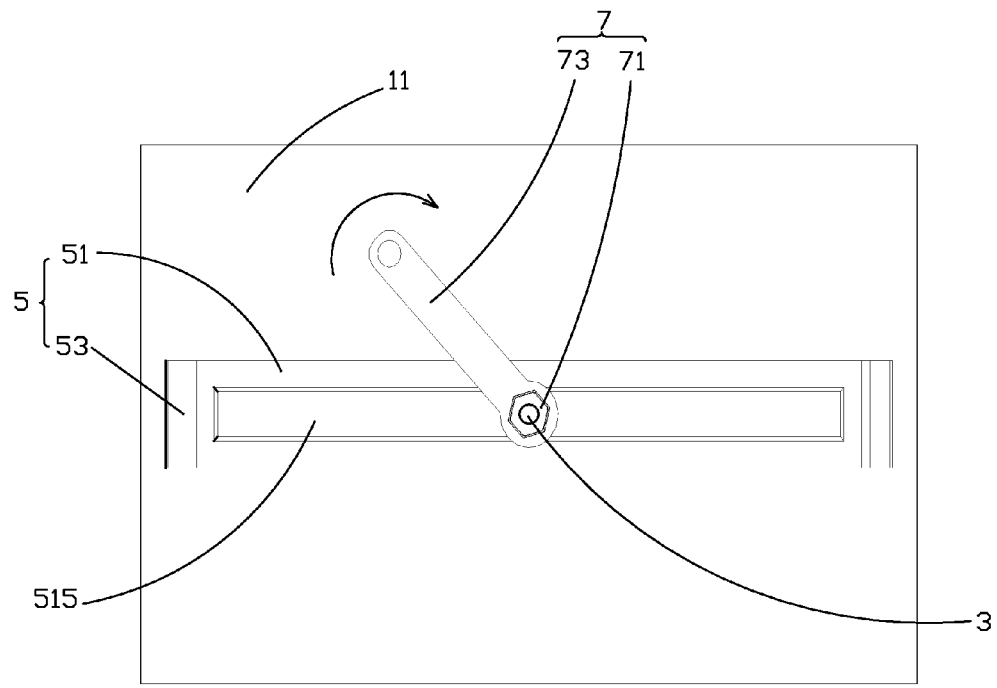
FIG. 2 is a front view showing the curvature adjustment structure of the curved liquid crystal display device according to the first embodiment of the present invention.
Figure 3:
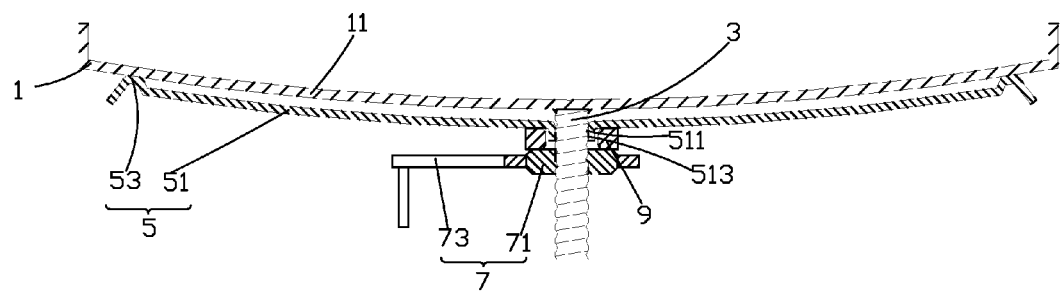
FIG. 3 is a top-side cross-sectional view showing the curvature adjustment structure of the curved liquid crystal display device according to the first embodiment of the present invention in which a backplane is in a condition of being curved.

Referring to FIGS. 1-3, which show a curvature adjustment structure of a curved liquid crystal display device according to a preferred embodiment of the present invention and is applicable to a small-sized curved liquid crystal display device, the curvature adjustment structure of the curved liquid crystal display device comprises: a backplane 1, a threaded rod 3 fixedly mounted to the backplane 1, a rack 5 arranged to correspond to the threaded rod 3 and having two ends positioned against the backplane 1, and an adjustment nut 7 in threading engagement with the threaded rod 3. The threaded rod 3 extends through the rack 5 and then mates the adjustment nut 7, whereby by rotating the adjustment nut 7 to compress or release the rack 5, the rack 5 is caused to compress or release the backplane 1 so as to achieve adjustment of the curvature of the backplane 1.

The curvature adjustment structure of the curved liquid crystal display device further comprises a backing ring 9 arranged between the adjustment nut 7 and the rack 5.

The backplane 1 is made of a material having excellent elasticity, preferably being made of spring steel or plastics, allowing for easy elastic deformation and restoration. The backplane 1 comprises a bottom board 11.

The threaded rod 3 is fixedly mounted to the bottom board 11 of the backplane 1 through welding or threading engagement. In a condition where the backplane 1 is not bent and curved, the threaded rod 3 has a length that is sufficient to extend through the rack 5, the backing ring 9, and the adjustment nut 7.

The rack 5 is set on a middle portion of an outside surface of the bottom board 11. The rack 5 comprises a rack body 51 and engagement sections 53 connected to opposite ends of the rack body and the rack 5 is arranged to be symmetric with respect to a center of the bottom board 11. The rack body 51 is of a curved form having a center in which a through hole 511 is formed to receive the extension of the threaded rod 3. The rack body 51 is provided with a raised annular step 513 around the through hole 511. The threaded rod 3 extends beyond the raised annular step 513 to project outside the rack 5. The engagement sections 53 are set in tight engagement with the bottom board 11 of the backplane 1. The engagement sections 53 are of a curved form for better engagement with the bottom board 11 of the backplane 1. The rack body 51 comprises a reinforcement rib 515 thereon for enhancing strength thereof.

The rack 5 is made of a material having high stiffness and strength and the stiffness and strength thereof are greater than those of the material of the backplane 1.

The adjustment nut 7 comprises a threading engagement section 71 and a handle 73 connected to the threading engagement section 71. The threading engagement section 71 and the threaded rod 3 are in threading engagement with each other. In the instant embodiment, the threading engagement section 71 has an external hexagonal configuration. The handle 73 functions for rotating the threading engagement section 71 for the purposes of convenience and effort saving.

The backing ring 9 is arranged between the adjustment nut 7 and the rack body 51 of the rack 5 and is fit around the raised annular step 513. The backing ring 9 has a thickness that is greater than height of the raised annular step 513 and provides an effect of indirectly increasing the contact area between the adjustment nut 7 and the rack body 51.

Figure 4:
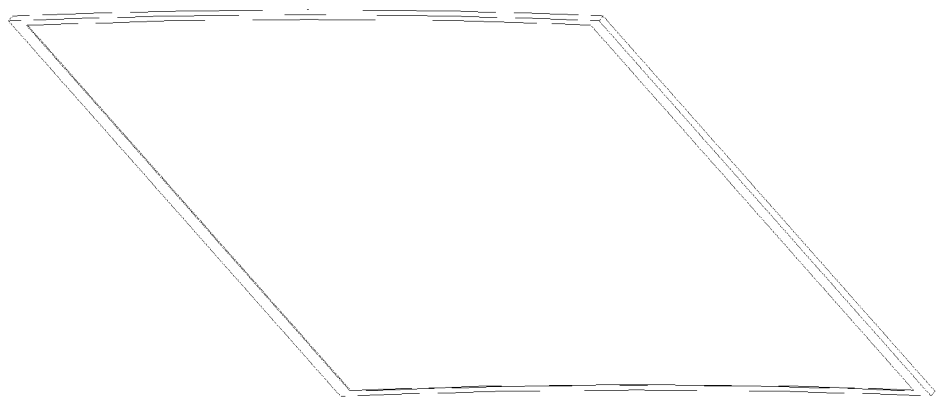
FIG. 4 is a perspective view showing a curved liquid crystal display device comprising the curvature adjustment structure of the curved liquid crystal display device according to the present invention.

In FIG. 1, the backplane 1 is in a condition of being not curved yet and is thus planar, whereby under such a condition, the curved liquid crystal display device serves as a planar liquid crystal display device. When the handle 73 is manually rotated, causing the adjustment nut 7 to rotate to have the threading engagement section 71 of the adjustment nut 7 to move and ascend along the threaded rod 3 in threading engagement therewith, the adjustment nut 7 presses against the rack 5 and the threaded rod 3 moves to descend with respect to the adjustment nut 7 and the rack 5. Since the threaded rod 3 is fixedly mounted to the bottom board 11 of the backplane 1, the backplane 1 is driven by the threaded rod 3 to simultaneously descend with respect to the rack 5, namely approaching the rack 5. Further, since the engagement sections 53 at the two ends of the rack 5 are positioned against the bottom board 11 of the backplane 1 and since the stiffness and strength of the material of the rack 5 are greater than those of the material of the backplane 1, due to the combined effect of being driven by the threaded rod 3 and being compressed by the rack 5, the backplane 1 undergoes elastic deformation and shows a curve that has different degree of bending due to different turns of rotation of the adjustment nut 7. The more turns that the adjustment nut 7 is rotated, the closer the backplane 1 approaches the rack 5, and this proceeds until what shown in FIG. 3 is reached, where the curves of the backplane 1 and the rack body 51 of the rack 5 substantially correspond to each other. Referring to FIG. 4, a curved liquid crystal display device comprising the curvature adjustment structure of the curved liquid crystal display device may follow the curving of the backplane 1 to show, in the entirety thereof, a curved configuration of which the curvature varies according to the number of turns of the rotation of the adjustment nut 7, whereby a user may easily and timely carry out adjustment of the curvature of the curved liquid crystal display device to suite the need for watching.

Similarly, rotating the handle 73 of the adjustment nut 7 in the opposite direction would cause the threading engagement section 71 of the adjustment nut 7 to move outward along the threaded rod 3 in threading engagement therewith and the adjustment nut 7 releases the rack 5, allowing the backplane 1 to get released and thus reducing the curving degree of the curved liquid crystal display device until it restores a planar form.

Figure 5:
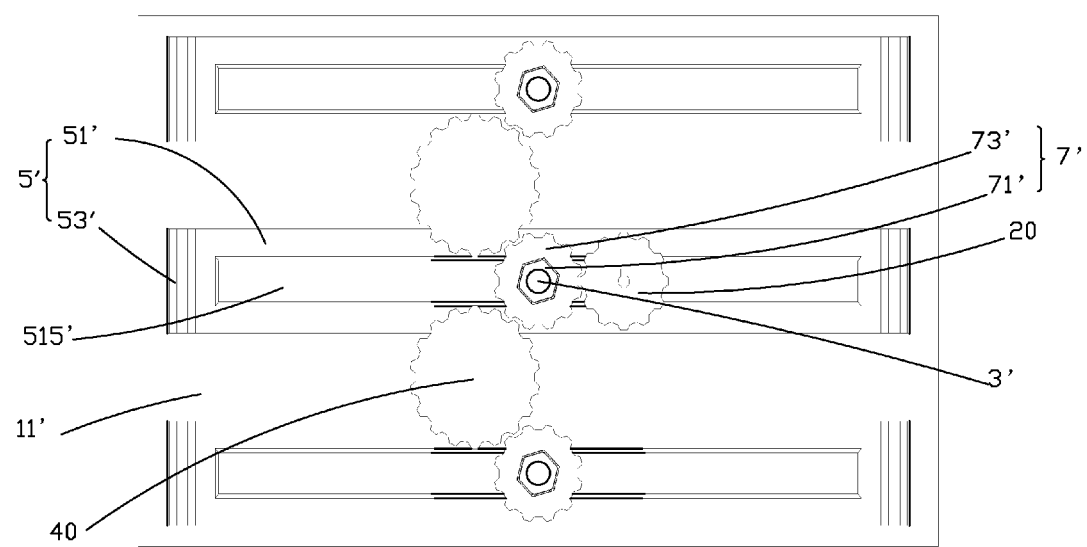
FIG. 5 is a front view showing a curvature adjustment structure of a curved liquid crystal display device according to another embodiment of the present invention.

Referring to FIG. 5, a curvature adjustment structure of a curved liquid crystal display device according to another preferred embodiment of the present invention is shown and is applicable to a large-sized curved liquid crystal display device. To make the deformation of the backplane 1' of the large-sized curved liquid crystal display device uniform, multiple racks 5' are provided, in a uniform distribution manner, on the bottom board 11' of the backplane 1' and automatic adjustment means is provided to substitute manual adjustment to ensure synchronization of the adjustments of the racks, so as to ensure the consistency of the curvature adjustment of the curved liquid crystal display device.

What is different from the previous embodiment is that, in the instant embodiment, a power gear 20 is additionally provided and adjustment nuts 7' each comprises a threading engagement section 71' in threading engagement with a threaded rod 3' and an adjustment gear 73' mating and coupled to the threading engagement section 71'. The adjustment gear 73' is arranged to mate a power gear 20.

Specifically, the number of each of the threaded rod 3', the rack 5' and the adjustment nut 7' is three and they are arranged to be equally spaced from each other with the adjustment gear 73' of the one of the adjustment nuts 7' that is located in the middle mating the power gear 20 and the adjustment gear 73' of the adjustment nut 7' that is located in the middle being respectively coupled to the adjacent adjustment gears 73' through transmission gears 40 for transmission of power.

The power gear 20 is coupled to a power source, such as an electric motor or a hydraulic motor (not shown). When the power source is put into operation, the power gear 20 drives the adjustment gear 73' of the middle adjustment nut 7' coupled thereto to rotate and the middle adjustment gear 73' drives, via the transmission gears 40 in engagement therewith, the adjacent adjustment gear 73' and the threading engagement sections 71' in engagement therewith to simultaneously rotate. The three adjustment nuts 7' rotate simultaneously and the rotational speed and the turns of rotation thereof are identical, whereby the backplane 1' is collectively acted upon by the three racks 5' and the three threaded rods 3' to undergo uniform curving and deformation, achieving a better effect of displaying of the curved liquid crystal display device.

In summary, the present invention provides a curvature adjustment structure of a curved liquid crystal display device, in which a threaded rod is fixedly mounted to a backplane and a curved rack is arranged with two ends thereof positioned against the backplane, an adjustment nut being provided in threading engagement with the threaded rod, so that by rotating the adjustment nut to compress or release the rack, the rack may compress or release the backplane in order to achieve adjustment of the curvature of the backplane thereby making the adjustment of the curvature of the curved liquid crystal display device easy, improving the product appeal to the market, and simplifying the structure to make it easy to make.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A curvature adjustment structure of a curved liquid crystal display device, comprising a backplane, at least one threaded rod fixedly mounted to the backplane, a rack arranged to correspond to the threaded rod and having two ends positioned against the backplane, and an adjustment nut in threading engagement with the threaded rod, wherein the threaded rod extends through the rack and mates the adjustment nut, whereby by rotating the adjustment nut to compress or release the rack, the rack is caused to compress or release the backplane so as to achieve adjustment of the curvature of the backplane.

2. The curvature adjustment structure of the curved liquid crystal display device as claimed in claim 1 further comprising a backing ring arranged between the adjustment nut and the rack.

3. The curvature adjustment structure of the curved liquid crystal display device as claimed in claim 2, wherein the rack comprises a rack body and engagement sections connected to opposite ends of the rack body and the rack, the engagement sections being set in tight engagement with the backplane, the rack body being of a curved form.

4. The curvature adjustment structure of the curved liquid crystal display device as claimed in claim 3, wherein the rack body has a center in which a through hole is formed to receive the extension of the threaded rod, the rack being symmetrically arranged.

5. The curvature adjustment structure of the curved liquid crystal display device as claimed in claim 4, wherein the rack body comprises a raised annular step formed around the through hole, the backing ring being fit around the raised annular step, the backing ring having a thickness greater than height of the raised annular step.

6. The curvature adjustment structure of the curved liquid crystal display device as claimed in claim 1, wherein the adjustment nut comprises a threading engagement section in threading engagement with the threaded rod and a handle connected to the threading engagement section.

7. The curvature adjustment structure of the curved liquid crystal display device as claimed in claim 1, wherein the rack is made of a material having stiffness and strength greater than stiffness and strength of a material of the backplane.

8. The curvature adjustment structure of the curved liquid crystal display device as claimed in claim 7, wherein the backplane is made of spring steel or a plastic material.

9. The curvature adjustment structure of the curved liquid crystal display device as claimed in claim 1, wherein the adjustment nut comprises a threading engagement section in threading engagement with the threaded rod and an adjustment gear connected to the threading engagement section, the adjustment gear mating a power gear.

10. The curvature adjustment structure of the curved liquid crystal display device as claimed in claim 9, wherein the number of threaded rod, the rack, and the adjustment nut is three for each, which are arranged in an equally spaced manner, the adjustment gear of the one of the adjustment nuts that is located in the middle mating the power gear, the adjustment gear of the one of the adjustment nuts that is located in the middle being in engagement with the adjacent ones of the adjustment gears via transmission gears for power transmission.

11. A curvature adjustment structure of a curved liquid crystal display device, comprising a backplane, at least one threaded rod fixedly mounted to the backplane, a rack arranged to correspond to the threaded rod and having two ends positioned against the backplane, and an adjustment nut in threading engagement with the threaded rod, wherein the threaded rod extends through the rack and mates the adjustment nut, whereby by rotating the adjustment nut to compress or release the rack, the rack is caused to compress or release the backplane so as to achieve adjustment of the curvature of the backplane;

further comprising a backing ring arranged between the adjustment nut and the rack;

wherein the rack comprises a rack body and engagement sections connected to opposite ends of the rack body and the rack, the engagement sections being set in tight engagement with the backplane, the rack body being of a curved form; and wherein the rack body has a center in which a through hole is formed to receive the extension of the threaded rod, the rack being symmetrically arranged.

12. The curvature adjustment structure of the curved liquid crystal display device as claimed in claim 11, wherein the rack body comprises a raised annular step formed around the through hole, the backing ring being fit around the raised annular step, the backing ring having a thickness greater than height of the raised annular step.

13. The curvature adjustment structure of the curved liquid crystal display device as claimed in claim 11, wherein the adjustment nut comprises a threading engagement section in threading engagement with the threaded rod and a handle connected to the threading engagement section.

14. The curvature adjustment structure of the curved liquid crystal display device as claimed in claim 11, wherein the rack is made of a material having stiffness and strength greater than stiffness and strength of a material of the backplane.

15. The curvature adjustment structure of the curved liquid crystal display device as claimed in claim 14, wherein the backplane is made of spring steel or a plastic material.

\* \* \* \* \*